UNITED STATES PATENT OFFICE

2,311,638

HALOGENATED COMPOUNDS CONTAINING A STEROL NUCLEUS

Adolf Butenandt, Berlin-Lichterfelde, Germany, assignor to Schering Corporation, Bloomfield, N. J., a corporation of New Jersey No Drawing. Original application November 2, 1936, Serial No. 108,808. Divided and this application September 23, 1937, Serial No. 165,317. In Germany November 5, 1935

2 Claims. (Cl. 260—397.3)

My invention relates to compounds containing a sterol nucleus and more particularly to halogenated compounds containing a sterol nucleus, and to the method of producing such compounds.

The present application is a division of my application Serial No. 108,808, filed November 2, 1936.

It is the general object of the invention to produce 2-halogenated cyclopentano polyhydro phenanthrene compounds, i. e. 2-halogenated steroids, which may themselves be employed therapeutically or which may be used for the production of therapeutically active substances, as by the removal of hydrogen halide to yield $\Delta^{1,2}$ unsaturated compounds, said compounds having in the 17-position either a keto or a secondary alcohol group.

Among compounds of sterol-like or steroid constitution are to be understood such compounds to which the following general constitutional formula can be ascribed:

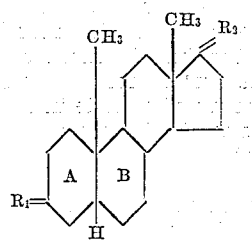

In this formula $R_1$ stands for hydrogen and a hydroxyl group or for oxygen and $R_2$ for any saturated or unsaturated hydrocarbon residue containing or free from oxygen and for hydrogen, or for an $R_3$ group and for hydrogen, or for an $R_3$ group and for a hydrocarbon residue, or for oxygen, wherein $R_3$ indicates a hydroxyl group or a group that upon hydrolysis can be reconverted into a hydroxy group. My invention thus involves the use of starting compounds, which possess a cyclopentano dimethyl polyhydro phenanthrene system and furthermore, in contradistinction to the follicle hormone, contain no aromatic ring. To these belong, for example, the sterols, the bile acids and their homologues together with degradation products, the toxigenines of the saponines, the male sex hormones of the androstan series and their isomers or substitution products and also the derivatives of all such compounds and the like, any hydrocarbon radical present in the starting material being degraded in the manner described below.

As already indicated, the halogenated compounds of the present invention may be employed to produce $\Delta^{1,2}$ unsaturated compounds of various kinds. Thus, to produce $\Delta^{1,2}$ unsaturated ketones wherein the keto group is at the 3-position, from the corresponding saturated ketones it is advantageous to proceed in such a manner that the 10,13-dimethyl steroid ketones are subjected to halogenation and subsequent splitting off of hydrogen halide, in which the rings indicated in the above formula by A and B are linked together in the same manner as in dihydrocholesterol, in the so-called trans-position. For, in this case, the halogen atom is introduced on the carbon atom 2 so that in the subsequent halogen hydride splitting the double bond is produced between the carbon atoms 1 and 2. Such a linking of the rings A and B in the trans-position is present, for example, in the male germinal gland hormone androsterone, in trans-androsterone and in cholestanone. In contradistinction thereto, in the isomeric koproandrosterones and in koprostanone the rings A and B are in the cis-position to one another; in these compounds the introduction of the halogen favorably takes place on the carbon atom 4 so that on halogen hydride splitting the double bond is formed between the carbon atoms 4 and 5. The introduction of the halogen takes place in known manner, bromine being preferably employed, although the other halogens may also be used. In order finally to split off the halogen hydride the halogenation product is suitably heated with potassium acetate in glacial acetic acid solution for several hours to elevated temperatures. Of course, other known methods for splitting off halogen hydride may be used likewise as is well known to chemists skilled in the art.

If in the starting material available there is not present on the carbon atom 3 a keto group but a hydroxyl group the the material concerned, prior to carrying out the process of the invention, is subjected to a corresponding oxidation treatment to introduce ketonic oxygen at the 3-position.

The degradation of any hydrocarbon residue which may be present in the cyclopentano ring of the steroid compounds can take place at any suitable stage of the process according to the invention. This degradation can be effected, for example, by energetic oxidation of the steroid compound by means of chromium trioxide (for this compare among others Ruzicka, Helv. chim. Acta 17, 1389, 1934); the side chain can, however, also be removed by systematic methods, such as by means of the so-called Grignard degradation (for this compare, for example, Dalmer, Berichte 68, 1814, 1935).

The following examples illustrate the invention:

Example 1

500 mg. of androstandione-(3,17) are dissolved in 10 ccs. of glacial acetic acid and treated with 10 drops of hydrobromic acid-glacial acetic acid and a quantity of bromine-glacial acetic acid solution corresponding to 0.9 mol of bromine.

Decolorization of the bromine solution takes place at once; the reaction product is precipitated with water, filtered off and recrystallized from methanol. From 480 mg. of crude crystallisate there are obtained after several recrystallizations 123 mg. of pure 2-bromo-androstandione. It crystallizes in needles of M. P. 213–214° C. with decomposition.

To obtain the corresponding unsaturated diketone, 200 mg. of the brominated product are heated with 8 ccs. of a 21% potassium acetate-glacial acetic acid solution for 5 hours to 180–200° C. in a bomb tube. After cooling the reaction products are poured into water and extracted with ether. The neutral portions of the ether extract are ground with a little methanol and allowed to stand for some time. In a yield of 10–15% there is then obtained, in the form of needles, the α-β-unsaturated ketone $\Delta^{1,2}$-androstendione; it exhibits a characteristic absorption maximum at 240 μ.

The $\Delta^1$-androstendione can also be isolated by high vacuum distillation of the neutral portions. By this means there distils between 130 and 140° C. under 0.001 mm. pressure a light oil which on recrystallization from dilute alcohol yields crystals. On recrystallization from dilute acetone and dilute alcohol there is obtained therefrom the $\Delta^1$-androstendione in feathery needles of M. P. 139–140°. $[\alpha]^{20°}_D = +6.8°$ (in alcohol).

The oxime of this substance is obtained in the following manner:

16 mg. of $\Delta^1$-androstendione are boiled with an alcoholic solution of hydroxylamine acetate (33 mg. hydroxylamine hydrochloride +50 mg. sodium acetate) for 3 hours on the water bath. The solution is then diluted with water and the crystallized oxime recrystallized from dilute alcohol. It commences to decompose above 225° C.; at 252° C. the decomposition is complete.

*Example 2*

460 mg. of androstanol-17-one-3 are dissolved in 30 ccs. of glacial acetic acid and treated with 10 drops of hydrobromic acid-glacial acetic acid and a solution of 0.9 mol of bromine in glacial acetic acid. The working up takes place as in Example 1 and yields 230 mg. of 2-bromo-androstanol-17-one-3 of M. P. 180–181° C. with decomposition.

The splitting off of the hydrobromic acid and the further working up takes place in the same manner as set forth in Example 1. There is thus obtained in about the same yield the $\Delta^{1,2}$-androstenol-17-one-3 likewise in the form of needles of M. P. 156° and $[\alpha]_D: -42.3°$; the α-β-unsaturated ketone exhibits the characteristic absorption maximum at 240 μ.

It is also possible to produce from the 2-bromo-androstanol-17-one-3 the diketone 2-bromo-androstandione-3,17 by allowing 31.3 mg. of 2-bromo-androstanol-17-one-3 to stand for 20 hours with 8.5 mg. of chromium trioxide to effect oxidation of the hydroxyl group. Then the whole is considerably diluted with water and extracted with ether. The ether residue is recrystallized from alcohol; 21.5 mg. of 2-bromo-androstandione of M. P. 213–214° C. with decomposition are obtained in needles. This oxidation product exhibits with the 2-bromo-androstandione prepared above no depression of the melting point. Yield: 69% of the theory. From the oxidation product the $\Delta^1$-androstendione can be produced in accordance with the procedure of Example 1.

Of course, many changes and variations may be made in the reaction conditions described in the above given examples. Thus, for instance, instead of androstanol-17-one-3 various 17-alkyl-androstanol-17-one-3 compounds may be employed as starting materials such as are obtained, for instance, by reacting androstanol-17-one-3 compounds with Grignard reagents. Instead of the ketones, also derivatives of the keto group may be employed, for instance, those wherein the keto group of the steroid ketones and the like is reacted with typical ketone reagents such as semi-carbazide, thiosemicarbazide, phenyl hydrazine, hydroxyl amine and the like.

The halogenation of these starting materials may be carried out not only in glacial acetic acid but also in other indifferent organic solvents, such as chloroform, carbon tetrachloride and the like provided the solvents are not substantially affected by halogen.

The separation and isolation of the halogenated intermediate compounds and of the unsaturated products can be accomplished not only in the manner described in the examples by precipitating with water and extracting with ether or by high vacuum distillation, but also by other methods, for instance, by making use of the formation of insoluble or difficulty soluble condensation products as with typical ketone reagents and the like.

The purification of said intermediate and unsaturated products may be done by fractional and/or repeated crystallizaiton, distillation, sublimation, and the like.

Of course, the amounts of the various agents and the type and the amounts of the solvents used in carrying out this invention, the temperatures employed and the other reaction conditions may be varied within the limits obvious to those skilled in the art; hence, many other changes and variations may be made in accordance with the principles set forth herein and in the claims annexed hereto.

I claim:

1. 2-bromo androstandione-3,17 of the following structural formula

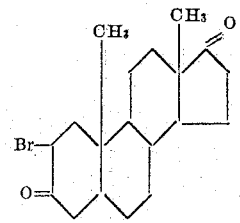

and the melting point 213–214° C. with decomposition.

2. 2-bromo androstanol-17-one-3 of the following structural formula

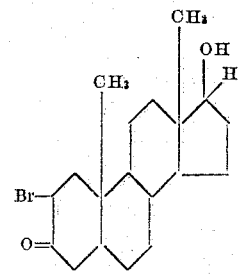

and the melting point 180–181° C. with decomposition.

ADOLF BUTENANDT.